April 22, 1969 D. E. PICCONE ET AL 3,440,501

DOUBLE-TRIGGERING SEMICONDUCTOR CONTROLLED RECTIFIER

Filed Feb. 2, 1967

INVENTORS:
DANTE E. PICCONE,
ISTVAN SOMOS,

BY Albert S. Richardson Jr.
ATTORNEY 3,440,501
Patented Apr. 22, 1969

3,440,501
DOUBLE-TRIGGERING SEMICONDUCTOR CONTROLLED RECTIFIER

Dante E. Piccone, Philadelphia, and Istvan Somos, Lansdowne, Pa., assignors to General Electric Company, a corporation of New York Filed Feb. 2, 1967, Ser. No. 613,612
Int. Cl. H01l 11/00, 15/00
U.S. Cl. 317—235 10 Claims

ABSTRACT OF THE DISCLOSURE

This is an improved form of the unique high-power multilayer semiconductor controlled rectifier that was heretofore described and claimed in a co-pending U.S. patent application Ser. No. 514,734, DeCecco, Piccone & Somos, filed Oct. 22, 1965, and assigned to the assignee of the present application now Patent No. 3,408,-545. Our idea is to further increase the turn-on *di/dt* capability of such a device by providing a second auxiliary region in one of its end layers at a location remote from the original auxiliary region (both auxiliary regions being free of the main electrode that is connected to the adjacent main region of that end layer), and by conductivity interconnecting these regions in such a manner that the second step of the turn-on process takes place in the vicinity of the additional auxiliary region which is relatively far removed from the initial pinpoint area of conduction.

Our invention is in the general field of solid-state electric current switches of the four-layer (PNPN) semiconductor type, and it relates more particularly to a high-power silicon controlled rectifier (known generally as a thyristor or SCR) having improved switching characteristics. As noted above in the abstract, it is a variant of the rectifier that is the claimed subject matter of the previously filed DeCecco et al. specification, which specification is herein incorporated by reference.

As was pointed out by DeCecco et al., one of the recognized limitations of broad-area, high-voltage SCR's has been their inability safely to endure very high rates of rise of anode current (the inrush current slope, or *di/dt*) during the turn-on process. When a gated SCR of conventional construction is triggered, anode current conduction invariably starts in a "pinpoint" area adjacent to the gate contact, and this is where the device fails if subjected to too high a *di/dt*. In order to expedite the spread of current from this small local area to the full area of a high-power device before the current density and localized heating can reach destructively high levels therein, DeCecco et al. proposed an electrode-less auxiliary region in one end layer of the device, which region is physically disposed between the main electrode connected to that end layer and the gate contact and is characterized by a lateral resistance sufficiently high to cause some of the current that initially traverses this region immediately to transfer to a parallel path in the adjoining layer where it acts as a relatively high-energy trigger signal for the broad area portion of the semiconductor body subtending the main electrode. By utilizing this double-triggering construction, dramatic increases in *di/dt* ratings have been realized, and turn-off characteristics have also been improved.

A general object of the present invention is to further improve the switching characteristics of a solid-state controlled rectifier, and a more specific object is to provide a semiconductor switching device that can safely withstand a turn-on *di/dt* duty even higher than that of the DeCecco et al. device.

In carrying out our invention in one form, we utilized an SCR built in accordance with the teaching of DeCecco et al. and we modify it in a manner that will now be summarized. We provide in one of the end layers of the four-layer semiconductor body, in addition to the main region and a laterally adjacent auxiliary region located between the main region and the gate contact of the original DeCecco et al. device, at least one other auxiliary region that is located remote from the original auxiliary region. The additional auxiliary region is free of main electrode connections but has a metal contact on an external face thereof, which contact is connected by way of a suitable low-impedance path to electroconductive material that is in contact with an external face of the original auxiliary region. By spacing the metal contact from the main region by a shorter distance than said electroconductive material is spaced therefrom, we ensure an improved distribution of both current and heat during the turn-on process of the device. When our device is triggered, the initially conducting path between its main electrodes comprises a pinpoint area adjacent to the gate contact, the electroconductive material overlaying the original auxiliary region, the aforesaid low-impedance path between said electroconductive material and the metal contact on the additional auxiliary region, and the additional auxiliary region itself. Consequently, main current initially traverses the additional auxiliary region instead of the original auxiliary region, and enough of this current immediately transfers to a parallel path in the adjoining layer of the semiconductor body to serve as a relatively high energy trigger signal for the portion of the body subtending the section of the main region that borders the added auxiliary region. Since this portion is remote from the initially conducting interlayer path of pinpoint area, it is relatively cool and has improved heat absorbing or dissipating capabilities, whereby the device will have lower switching losses and a higher *di/dt* can safely be imposed thereon. The additional auxiliary region is preferably arranged to promote a swift spread of main current over the whole area of the main region of the device.

Our invention will be better understood and its various objects and advantages will be more fully appreciated from the following description taken in conjunction with the accompanying drawing in which.

FIGS. 3, 4, 5, and 6 are plan views of similar devices embodying alternative forms of the invention.

Figure 1:
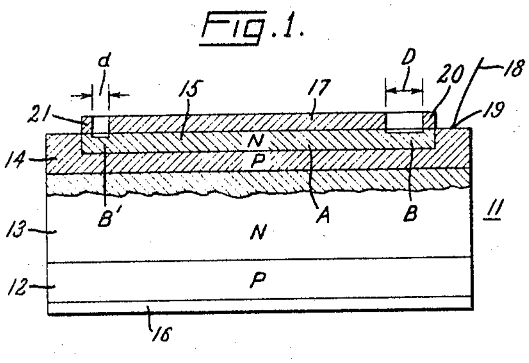
FIG. 1 is an elevational view, partly in section and not to scale, of a semiconductor switching device constructed in accordance with one form of our invention.
Figure 2:
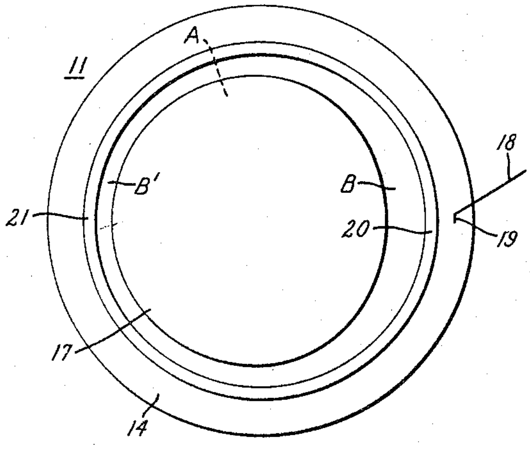
FIG. 2 is a plan view of the device shown in FIG. 1.

Referring now to FIGS. 1 and 2, we have shown a disc-like asymmetrically conductive body 11 comprising four circular layers or zones 12, 13, 14, and 15 of semiconductor material (preferably silicon) arranged in succession between a pair of main current-conducting electrodes comprising metallic contacts 16 and 17. Contiguous layers of the body 11 are of different conductivity types, and their interface boundaries thereby form rectifying junctions. More particularly, as is shown in FIG. 1, the lower end layer 12 of the body 11 is of P-type conductivity, the contiguous internal layer 13 is of N-type conductivity, the next intermediate layer 14 is of P-type conductivity, and the upper end layer 15 is of N-type conductivity. One of the main electrodes 16 is superimposed on and bonded to the P-type end layer 12 in a manner forming a low-resistance ohmic junction therewith, and this electrode is referred to as an anode of the illustrated device. The companion main electrode 17 is a thin gold disk connected in a similar manner to the opposite N-type end layer 15 of the body 11 and is referred to as a cathode. In the embodiment of the invention that has been shown in FIGS. 1 and 2, a gate lead 18 is connected to an accessible peripheral portion of the intermediate P-type layer 14 of the body 11 by way of a control electrode or contact 19 located closely adjacent to the N-type end layer 15.

The above-described device can be constructed by any of a number of different techniques that are well known in the semiconductor art today. See, for example, the above-mentioned DeCecco et al. specification for further details. While thin solid lines and distinct hatching have been used in FIG. 1 to illustrate the various interface boundaries in the PNPN body 11, those skilled in the art will understand that these boundaries are not such discretely definable plane surfaces in practice. Although in the present drawing its thickness has been exaggerated for the sake of clarity, the body 11 is really a very thin wafer having a relatively large diameter, e.g., 1 inch or more.

To complete a commercially practical component, the device shown in FIGS. 1 and 2 can be mounted in a hermetically-sealed insulating housing of any suitable design, with its electrodes 16, 17, and 18 being respectively connected to separate terminal members of the housing which members in turn are adapted to be connected to external electric circuits in which the device will be used. One example of an improved housing for this purpose is fully disclosed in a co-pending patent application Ser. No. 436,711, Rosser, filed on Feb. 12, 1965, and assigned to the assignee of the present invention.

In accordance with the prior teachings of DeCecco et al., a predetermined one of the opposite end layers of the semiconductor wafer 11 has been divided into juxtaposed regions A and B that are disposed laterally adjacent to each other. In FIG. 1 the end layer 15 is so divided into a main region A, which is in relatively broad area ohmic contact with the substantially co-extensive cathode 17, and a smaller auxiliary region B, which is free of cathode connections. Both of the regions A and B are contiguous with the intermediate P-type layer 14 that adjoins the end layer 15.

The auxiliary region B is located between the main region A of end layer 15 and the gate contact 19 on intermediate layer 14. As is best seen in FIG. 1, there is electroconductive material 20 overlaying a peripheral part of the auxiliary region B in intimate contact with the external face thereof. This overlay is spaced from the nearest border or edge of the main region A by a gap having a maximum width D, and hence it is remote from the cathode 17. Note, however, that as a matter of manufacturing convenience the overlay 20 can be an island of the same material (e.g., gold) as the cathode, isolated therefrom by an etching process. The auxiliary region B is so constructed and arranged that the lateral resistance between the island 20 and the cathode 17 will be higher than that of any section of the main region A having a lateral dimension corresponding to the minimum distance between the island 20 and the bordering main region. While this result could be obtained by altering the electrical properties of the auxiliary region B relative to the main region A, we prefer to obtain it by geometry effects.

As it is shown in FIG. 1, the auxiliary region B extends laterally from a peripheral border of the adjoining main region A, and to increase its lateral resistance the thickness of the auxiliary region has been reduced. Thus the main and auxiliary regions have discretely different thicknesses, with the latter being thinner than the former. (The "thickness" of the region refers to its dimension parallel to the direction of main current flow between the anode 16 and the cathode 17 of the device, and "lateral" refers to a direction oriented perpendicular thereto.) Preferably the thinner auxiliary region B is formed by etching or abrading a portion of the original outer surface of the end layer 15 until some of the semiconductor material comprising this layer is removed, whereby the thickness of the remaining material adjoining the main region A is reduced. As shown, the etched part of the auxiliary region B is separated from the gate contact 19 by the unreduced peripheral part of the same region subtending the island 20.

The semiconductor device described in the preceding six paragraphs is the subject matter of the above-mentioned specification of DeCecco et al. who contemplate a two-step turn-on process that we will now briefly summarize. It will be assumed that the main electrodes of the device are connected in an external circuit that includes a load and a source of forward bias voltage of such polarity that the anode is positive with respect to the cathode. When triggered by an appropriate control signal applied to the gate contact 19, the previously non-conducting PNPN wafer 11 will start to conduct load current which begins as a microplasma of pinpoint area between its main electrodes 16 and 17. The interlayer path that initially conducts is near the gate contact 19, and according to DeCecco et al. the current flowing between this path and the cathode 17 will initially traverse the auxiliary region B of the end layer 15. As a result of main current traversing the reltively high lateral resistance of the region B, a substantial potential difference is developed between the island 20 and the cathode 17 and a significant fraction of this current immdiately transfers to a parallel path through the adjoining semiconductor layer 14 and through the rectifying junction between 14 and the main region A of the end layer 15. The transferred fraction of current bypasses the auxiliary region B and serves as a relatively high-current trigger signal for the broader area portion of the wafer 11 subtending the cathode 17, whereupon the device bruptly switches to a low-forward-impedance conducting state with a high *di/dt* capability.

We have discovered that further improvements in the performance of such a device can be realized by encouraging the second step of this turn-on process to take place in one or more areas of the wafer 11 relatively far removed from the initial interlayer path of conduction. Toward this end, we provide in the end layer 15 of N-type semiconductor material at least one additional auxiliary region B, which will next be described.

As can be clearly seen in FIG. 1, the additional auxiliary region B′ of the end layer 15 extends laterally from the main region A at a location remote from the original auxiliary region B. The construction of the additional region B′ is generally similar to that of the first region B. B′, like B, is free of main electrode connections, and there is metallic means 21 (e.g., gold) spaced from the cathode 17 in intimate contact with an external face thereof. In accordance with our invention, the auxiliary region B′ and its overlaying contact 21 are so constructed and arranged that the resistance measured between contact 21 and cathode 17 is lower than the lateral resistance of the first auxiliary region B. Preferably this is accomplished simply by spacing the contact 21 from the main region A by less than the minimum distance that separates the island 20 on the auxiliary region B from the main region A. The minimum width *d* of the gap between the contact 21 and the cathode 17 has been shown in FIG. 1 where it will be observed that *d* is shorted than D. Also according to our invention, the metallic contact 21 on the additional auxiliary region B′ and the metallic island 20 on the first auxiliary region B are conductively interconnected by means of a suitable low-impedance path.

As a result of the foregoing modifications, our device turns on in the following manner. This interlayer path of pinpoint area that initially conducts main current will be adjacent to the gate contact 19 as before. However, because the electrical conductivity of the gold island 20, the gold contact 21, and their low-impedance interconnecting means is so much higher than that of silicon, and because the lateral resistance of the added auxiliary region B′ is lower than that of the original region B, a substantial amount of the initial current between this path and the cathode 17 bypasses the auxiliary region B and instead follows a preferred path comprising the interconnection between 20 and 21 and the auxiliary region B′. As a consequence of load current initially traversing the additional auxiliary region B′, the second step of the previously described turn-on process will take place there. Being remote from the initially conducting interlayer path, the portion of the wafer 11 in the vicinity of B′ is relatively cool and can safely endure a higher *di/dt* than has heretofore been possible, and the initial path benefits by its thermal isolation from that remote portion.

In each of the first two embodiments of our invention (FIGS. 1–3), the additional auxiliary region B′ has been merged with the original auxiliary region B so that these two regions actually comprise different parts of a single annular peripheral region of the end layer 15. The latter region circumscribes the main region A of the same end layer, and the overlaying contacts 20 and 21 are both integral parts of a continuous metal band connected to a corresponding peripheral part of this annular region. In accordance with our invention, the continuous metal band, which preferably is a ring-like island of gold that also serves as the means for interconnecting 20 and 21, is non-uniformly spaced from the main region A and hence from the perimeter of the superimposed cathode 17.

As is best seen in FIG. 2, the non-uniform spacing between the ring-like island 20, 21 and the cathode 17 can be obtained by making the border of the main region A eccentric with respect to the circular end layer 15 of the wafer 11, while leaving the island concentric with respect thereto. The width of the annular gap separating the ring-like island from the main region A is maximum (D) in the vicinity of the point at which the auxiliary region B is nearest the gate contact 19, and it is minimum (d) in the vicinity of a diametrically opposite point. Although the width of the illustrated gap progressively varies between maximum and minimum, we also contemplate an arrangement whereby the minimum width (d) of the annular gap is uniformly maintained along at least the quadrants thereof adjoining the aforesaid diametrically opposite point.

Figure 3:
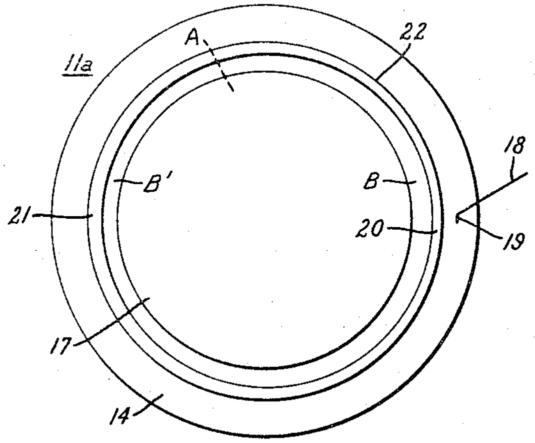

As can be seen in FIG. 3, the non-uniform spacing between the ring-like island and the cathode can alternatively be obtained by making the border of the main region A concentric with respect to the semiconductor wafer **11*a* and by using an island 22 having a non-uniform width. The island 22 is narrower where it extends between the main region A and the gate contact 19** than it is in the vicinity of a diametrically opposite point.

Figure 4:
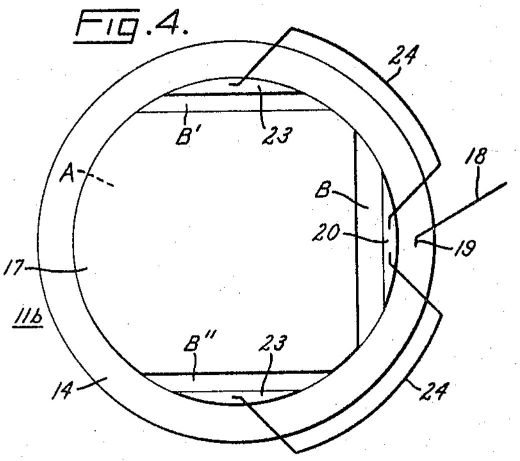

In the third embodiment of our invention that is illustrated in FIG. 4, the end layer 15 of a semiconductor wafer **11*b* has been equipped with two additional auxiliary regions B′ and B″. These additional regions comprise cathode-less peripheral segments of the end layer 15 that are separate from the auxiliary region B and from each other, each extending laterally from the main region A at a location approximately in quadrature with respect to the region B. Each of the regions B, B′, and B″ comprises a chordally disposed channel or strip adjoining the main region A and a distal part that is overlaid by a gold island remote from the cathode 17. The island connected to the region B is identified in FIG. 4 by the reference number 20, and the island connected to each of the auxiliary regions B′ and B″ is identified by the reference number 23. In this embodiment, we use wires 24 to conductively connect island 20 to each of the separate islands 23**. In order to give the first auxiliary region B a higher lateral resistance, its chordally disposed strip is wider than that of each additional region B′, B″. The turn-on operation of this device is essentially the same as that of the first embodiment previously described.

Figure 5:
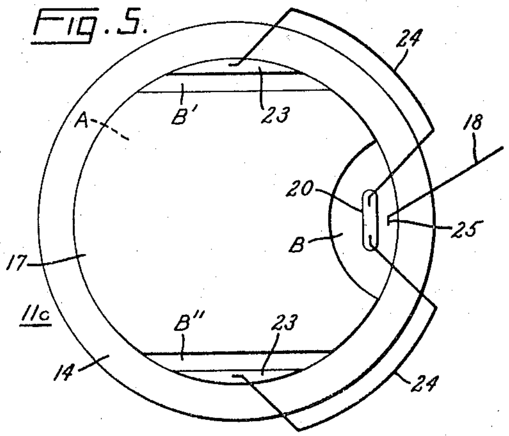

FIG. 5 shows a modification of the device described in the preceding paragraph. Here the gate lead 18 is connected to a wafer **11*c* by means of a contact 25 on the exposed face of a peripheral part of the auxiliary region B in the end layer 15 of N-type semiconductor material. As before, the gold island 20 is located between the main region A of the same end layer and the contact 25**, and it is spaced from the nearest border of the main region by a minimum distance that is greater than the width of the chordally disposed strip of each of the additional auxiliary regions B′ and B″.

Figure 6:
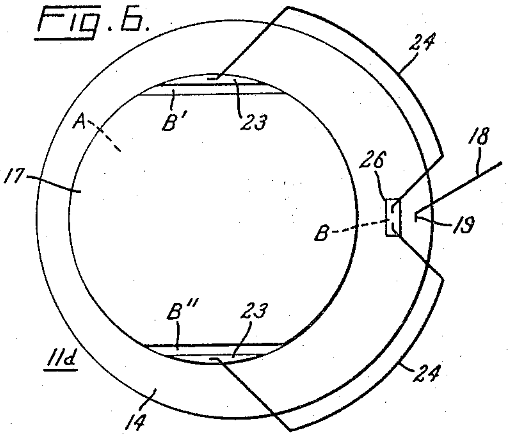

Another way of practicing our invention has been shown in FIG. 6. The illustrated wafer **11*d* is generally similar in structure and in operation to that of the FIG. 4 embodiment, except that the relatively small first auxiliary region B of its end layer of N-type semiconductor material is not contiguous with the laterally adjacent main region A. The external face of this auxiliary region is completely covered by a gold island 26 which is separated from the cathode 17** by a distance greater than the width of the chordally disposed strips of the two additional auxiliary regions B′ and B″.

Still other alternatives will be apparent. For example, the wire 24 could impinge directly on the exposed face of the additional auxiliary reigon of our invention, instead of being connected to an overlaying gold island 23. Either the original or the additional auxiliary region could be inboard with respect to the cathode 17, in which case that auxiliary region would be completely circumscribed by both the laterally adjacent main region A and the conforming cathode 17 of the device. If the original auxiliary region B were inboard, then this region and its gold island 20 could be centrally apertured to expose a surface of the intermediate layer 14 of the device for contact by the gate lead 18.

Furthermore, the improved *di/dt* capabilities of our invention can also be obtained in PNPN semiconductor devices that are turned on the forward "avalanche" mode. When such a device is subjected to a forward anode-to-cathode voltage equal to a predetermined breakover magnitude ($V_{BO}$), it switches from a blocking to a conducting state. Conduction starts in a pinpoint area where the first microplasma occurs and then progressively spreads over the whole area of the silicon wafer. The pinpoint area of initial conduction may be either in the center or near the edge of the wafer, and its location can be predicted. The latter case can be accomodated by using an annular auxiliary region like that shown in FIG. 2 or FIG. 3, and the former can be accomodated by relocating the original auxiliary region B centrally in the end layer 15. The objective in either case is to locate the first auxiliary region B closer than any other part of the end layer 15 to the interlayer path that initially conducts main current when the device is triggered. Due to the presence of our additional auxiliary region or regions, the second step of the resulting turn-on process is encouraged to take place in cooler areas of the device that are remote from this initially conducting path.

While various alternative forms of our invention have been shown and described in detail by way of illustration, still other modifications will probably occur to those skilled in the art. For example, all conductivity types shown in FIG. 1 could be reversed. Therefore, we contemplate by the concluding claims to cover all such modifications as fall within the true spirit and scope of our invention.

What we claim as new and desire to secure by Letters Patent of the United States is:

1. An improved controlled rectifier comprising a plurality of layers of semiconductor material arranged in succession between first and second main current-conducting electrodes, with contiguous layers being of different conductivity types so that rectifying junctions are formed therebetween, a first one of the opposite end layers of semiconductor material including a main region in relatively broad area contact with said first electrode and an auxiliary region disposed laterally adjacent thereto, said auxiliary region being located closer than any other part of said first end layer to the interlayer path that initially conducts main current when said rectifier is triggered from a relatively high-impedance nonconducting state to a low-impedance conducting state, wherein the improvement comprises:

(a) electroconductive material in contact with an external face of the auxiliary region of said first end layer and spaced from the nearest border of said main region by at least a predetermined minimum distance, (b) an additional auxiliary region of said first end layer extending laterally from said main region at a location remote from the first-mentioned auxiliary region, (c) metallic means in contact with an external face of said additional auxiliary region and spaced from said main region by less than said predetermined distance, and (d) means for conductively connecting said electroconductive material to said metallic means.

2. The controlled rectifier of claim 1 in which the main region is circumscribed by a peripheral region of said first end layer, said peripheral region being free of main electrode connections, in which the auxiliary regions of said first end layer comprise different parts of its peripheral region, and in which said electroconductive material, said metallic means, and said connecting means are all integral parts of a continuous metal band in contact with said peripheral region and non-uniformly spaced from said main region.

3. The controlled rectifier of claim 1 in which said metallic means comprises electroconductive material overlaying part of said additional auxiliary region remote from said first electrode.

4. The controlled rectifier of claim 3 in which the first end layer is circular, in which the auxiliary regions are separate peripheral segments of said first end layer, each comprising a chordally disposed strip adjoining said main region and a second part adjoining said strip in spaced-apart relation to said main region, the second part only being overlaid by electroconductive material, and in which the chordally disposed strip of the first-mentioned auxiliary region is wider than that of the additional auxiliary region.

5. The controlled rectifier of claim 1 in which there are two additional auxiliary regions of said first end layer, said additional regions being separate from the first-mentioned auxiliary region and from each other and each extending laterally from the main region at a location approximately in quadrature with respect to said first-mentioned auxiliary region.

6. An improved semiconductor device comprising a disc-like wafer having four layers of semiconductor material arranged in succession between first and second main electrodes, with contiguous layer being of different conductivity types, said device being adapted to be triggered from a non-conducting state to a conducting state by means of a control electrode connected to one of said layers, a first one of the opposite end layers of semiconductor material comprising a main region in relatively broad area contact with the first main electrode and an annular auxiliary region disposed laterally adjacent to a border of said main region, said auxiliary region being free of said first main electrode and being at one point located between said main region and the control electrode connection, wherein the improvement comprises:

a ring-like island of electroconductive material intimately connected to a peripheral part of said auxiliary region and spaced from said border of said main region by an annular gap of non-uniform width, said electroconductive material and the main and the auxiliary regions of said first end layer being so arranged that said gap has maximum width in the vicinity of said one point of said auxiliary region and has minimum width in the vicinity of a diametrically opposite point.

7. The semiconductor device of claim 6 in which the border of said main region is eccentric with respect to said first end layer and said island of electroconductive material is concentric with respect thereto.

8. The semiconductor device of claim 7 in which said minimum width of said gap is uniformly maintained along the quadrants thereof adjoining said diametrically opposite point.

9. The semiconductor device of claim 6 in which the annular auxiliary region is concentric with respect to said first end layer and said ring-like island of electroconductive material has a non-uniform width, being narrower in the vicinity of said one point than in the vicinity of the diametrically opposite point.

10. An improved controlled rectifier comprising a plurality of layers of semiconductor material arranged in succession between first and second main current-conducting electrodes with contiguous layers being of different conductivity types so that rectifying junctions are formed therebetween, a first one of the opposite end layers of semiconductor material including a main region in relatively broad area contact with said first electrode and an auxiliary region disposed laterally adjacent thereto, said auxiliary region having a predetremined lateral resistance and being located colser than any other part of said first end layer to the interlayer path that initially conducts main current when said rectifier is triggered from a relatively high-impedance nonconducting state to a low-impedance conducting state, wherein the improvement comprises:

(a) electroconductive material in contact with an external face of the auxiliary region of said first end layer and spaced from said main region, said predetermined resistance of said auxiliary region being measured between said electroconductive material and said first electrode, (b) an additional auxiliary region of said first end layer extending laterally from said main region at a location remote from the first-mentioned auxiliary region, (c) metallic means in contact with an external face of said additional auxiliary region and spaced from said main region, said additional auxiliary region being so constructed and arranged that the resistance between said metallic means and said first electrode is lower than said predetermined resistance, and (d) means for conductively connecting said electroconductive material to said metallic means.

References Cited

UNITED STATES PATENTS

| | | | |
|---|---|---|---|
| 3,256,470 | 6/1966 | Gerlach | 317—235 |
| 3,263,139 | 7/1966 | Turner | 317—235 |
| 3,275,909 | 9/1966 | Gutzwiller | 317—235 |
| 3,317,746 | 5/1967 | Hutson | 307—88.5 |
| 3,381,186 | 4/1968 | Arends | 317—235 |
| 3,344,323 | 9/1967 | Einthoven et al. | 317—235 |

FOREIGN PATENTS

| | | |
|---|---|---|
| 1,452,718 | 7/1965 | France. |

JOHN W. HUCKERT, *Primary Examiner.*

M. EDLOW, *Assistant Examiner.*

U.S. Cl. X.R.

317—234; 307—305